US008381379B2

(12) United States Patent
Holmes et al.

(10) Patent No.: US 8,381,379 B2
(45) Date of Patent: Feb. 26, 2013

(54) APPARATUS AND TOOLS FOR USE WITH COMPRESSORS

(75) Inventors: James B. Holmes, Fountain Inn, SC (US); Randall S. Corn, Travelers Rest, SC (US); John W. Herbold, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 821 days.

(21) Appl. No.: 12/539,777

(22) Filed: Aug. 12, 2009

(65) Prior Publication Data
US 2010/0263183 A1    Oct. 21, 2010

Related U.S. Application Data

(60) Provisional application No. 61/170,236, filed on Apr. 17, 2009.

(51) Int. Cl.
*B23P 19/04* (2006.01)
(52) U.S. Cl. .............................. 29/254; 29/889.1; 29/821
(58) Field of Classification Search ............... 29/244, 29/426.1, 426.5, 700, 821, 254, 889.1
See application file for complete search history.

(56) References Cited

U.S. PATENT DOCUMENTS

| | | | | |
|---|---|---|---|---|
| 3,673,668 A * | 7/1972 | Crook | ............................. | 29/254 |
| 4,078,290 A * | 3/1978 | Fletcher et al. | ................. | 29/252 |
| 4,096,614 A * | 6/1978 | Brungard et al. | ............ | 29/889.1 |
| 4,805,282 A * | 2/1989 | Reaves et al. | ................. | 29/889.1 |
| 7,024,744 B2 | 4/2006 | Martin et al. | | |
| 7,207,203 B2 * | 4/2007 | Corn | ............................... | 72/316 |
| 8,117,727 B2 * | 2/2012 | McCarvill | ..................... | 29/426.5 |
| 8,157,620 B2 * | 4/2012 | Corn et al. | ........................ | 451/57 |
| 2007/0079506 A1 * | 4/2007 | Gautreau et al. | ......... | 29/888.021 |
| 2008/0115648 A1 * | 5/2008 | Sherlock et al. | ................ | 83/745 |
| 2008/0118352 A1 * | 5/2008 | Wheeler et al. | ............ | 415/209.2 |
| 2009/0265908 A1 * | 10/2009 | Corn et al. | .................... | 29/426.1 |
| 2010/0071183 A1 * | 3/2010 | McCarvill | ....................... | 29/244 |
| 2010/0162546 A1 * | 7/2010 | Kalmar et al. | .................. | 29/244 |
| 2010/0263183 A1 * | 10/2010 | Holmes et al. | ................... | 29/244 |
| 2010/0266356 A1 * | 10/2010 | Holmes et al. | ................ | 408/126 |
| 2011/0179645 A1 * | 7/2011 | Silieti et al. | ................... | 29/889.1 |

* cited by examiner

*Primary Examiner* — Lee D Wilson
*Assistant Examiner* — Jamal Daniel
(74) *Attorney, Agent, or Firm* — James W. Pemrick; Ernest G. Cusick; Frank A. Landgraff

(57) ABSTRACT

A tool is provided for use in removing at least one airfoil. The tool includes a skid for mounting tool components, a vibrator attached to the skid, at least one jaw connected to a jaw activator. The jaw is configured to engage the airfoil. Power supply means are provided for powering the tool.

19 Claims, 7 Drawing Sheets

APPARATUS AND TOOLS FOR USE WITH COMPRESSORS

CROSS-REFERENCE TO RELATED APPLICATIONS

This application claims priority to U.S. Provisional Application Ser. No. 61/170,236, titled "Apparatus And Tools For Use With Compressors" and filed on Apr. 17, 2009.

BACKGROUND OF THE INVENTION

The present invention relates to compressors and particularly relates to apparatus for repairing or upgrading components in compressors.

In axial flow compressors, stator vanes alternate with rotating blades or buckets in the various stages of the compressor. The stator vanes are circumferentially spaced one from the other about the compressor axis and are secured to the upper and lower compressor casing halves. The upper and lower casing halves are joined one to the other at the compressor midline and provide a complete circumferential array of stator vanes for each compressor stage. As each rotating blade mounted on the rotor completes each revolution at a given rotational velocity, the rotating blade receives aerodynamic excitation pulses from each stator vane. This pulse can be generated from the wake of the upstream stator vane or the bow wave of the downstream stator vane. It is also possible to generate excitations in the rotating blade from differences between the upstream and downstream stator vane counts. These pulses induce a vibratory response in the rotating blade that can be deleterious to the rotating blade causing failure due to high cycle fatigue.

Typically the stator vane or blade count in the upper and lower halves of the compressor casing for a given stage are equal in number to one another. For example, in an initial stage S0 of a given compressor, the blade count for the stator vanes in each of the upper and lower compressor casing halves may be 24/24. In the next stage S1, the blade count may be 22/22. The first number represents the number of stator vanes in the upper casing half and the second number represents the number of stator vanes in the lower casing half of the same stage. The total stator vane count in S0 and S1 is therefore forty-eight and forty-four stator vanes respectively. However, because of the vibratory responses of the rotating blades, non-uniform vane spacings between upper and lower casing halves have been used in the past. Thus, different and alternative upper and lower blade counts in succeeding stages have been provided to reduce or eliminate the vibratory response. For example, in one compressor, stages S0 and S1 have had vane counts of 24/23 and 23/24, respectively. These non-uniform blade counts have been used in original equipment manufacture.

There are, however, a significant number of compressors in use in the field where there is an equal number of stator vanes in the upper and lower compressor halves for given stages. Certain other compressors in the field have an unequal number of stator vanes in the upper and lower compressor halves with adjacent stages, e.g. S0 and S1, having equal numbers of blades but alternate blade counts between the upper and lower halves of the compressor casing. Changing blade counts in the field was not previously considered practical since costly removal of the rotor in the field was required.

Because the rotor is closely fitted to the middle and aft (or rearward) sections of the compressor, it is geometrically difficult to reach the areas where the blades reside or to drill, tap, and counter-bore load dam pin holes in the area desired. Additionally, the current known methods for removal of these blades increase the likelihood that the rotor, stator blades or adjacent hardware may be damaged during the removal process. Moreover, the extended reach and limited access to the stator blades being removed underneath the rotor and rotor blades creates an ergonomic issue potentially leading to operator injury.

BRIEF DESCRIPTION OF THE INVENTION

In accordance with one aspect of the present invention, a tool is provided for use in removing at least one airfoil. The tool includes a skid for mounting tool components, a vibrator attached to the skid, and at least one jaw connected to a jaw activator. The jaw is configured to engage the airfoil. A power supply is used for powering the tool.

In accordance with another aspect of the present invention, a tool is provided for use in removing at least one airfoil. The tool includes a skid for mounting tool components and the skid is configured to engage and slide along at least one groove in a case of a dynamoelectric machine. A vibrator is attached to the skid, and at least one jaw is connected to a jaw activator. The at least one jaw is configured to engage the airfoil. A power supply is used for powering the tool.

DETAILED DESCRIPTION OF THE INVENTION

Figure 1:
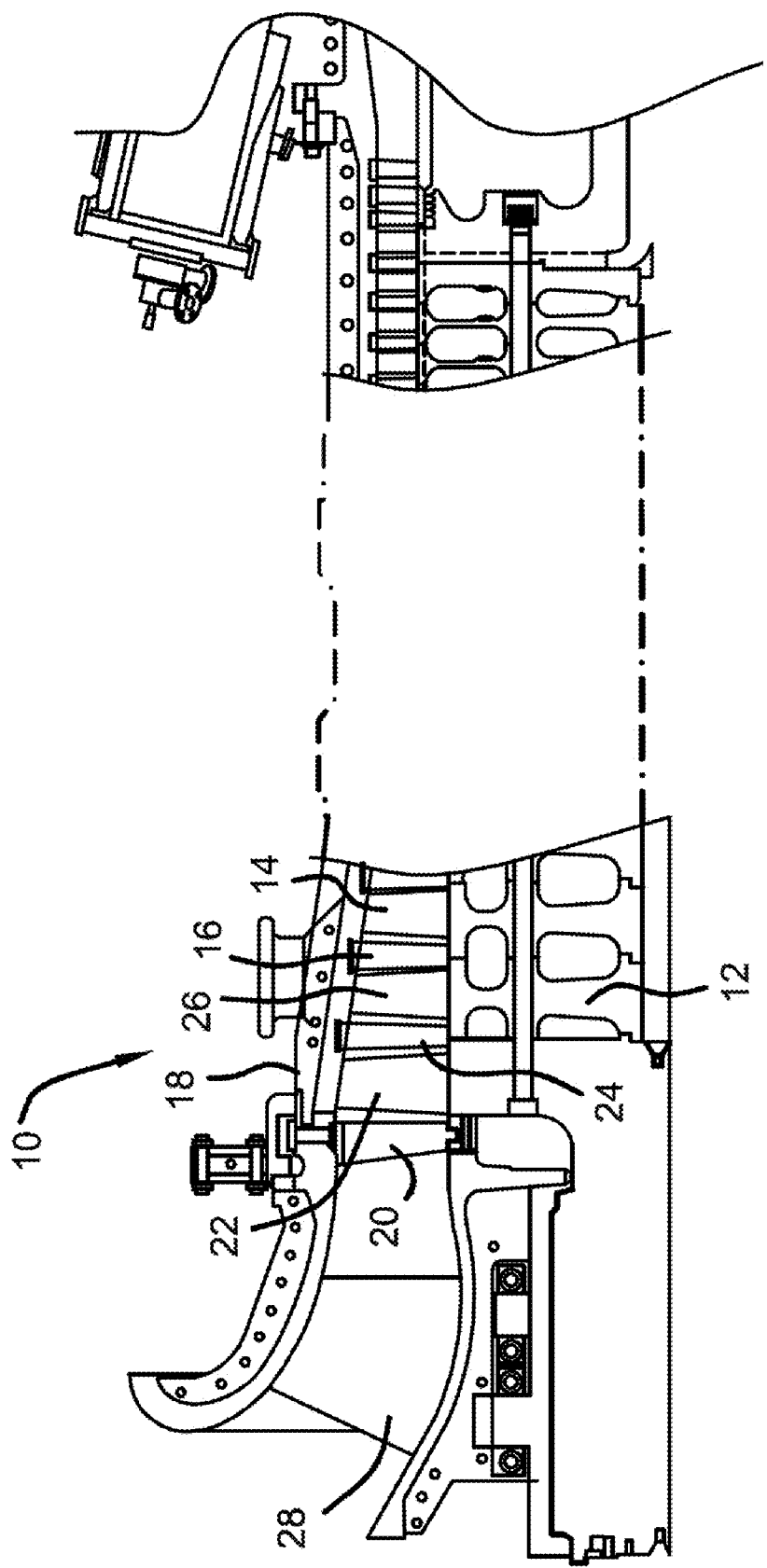
FIG. 1 is a schematic illustration with parts broken out for clarity of the upper half of a compressor illustrating various compressor stages.

Referring to FIG. 1, there is illustrated an upper half of a compressor generally designated 10. Compressor 10 includes a rotor 12 mounting buckets or blades 14 for rotation about the axis of the compressor and stator vanes 16 fixed to the upper casing half 18. Buckets, blades and/or vanes can be referred to as airfoils, and the term airfoil can be defined to include rotating or stationary, buckets, blades, and/or vanes. It will be appreciated that the blades 14 of the rotor are circumferentially spaced one from the other about the rotor axis and that the stator vanes 16 are similarly circumferentially spaced one from the other about the axis. The vanes and buckets form various stages of the compressor. For example, the vanes 20 and buckets 22 constitute compressor stage S0 while the vanes 24 and buckets 26 constitute stage S1. Inlet guide vanes 28 are also illustrated in FIG. 1.

Figure 2:
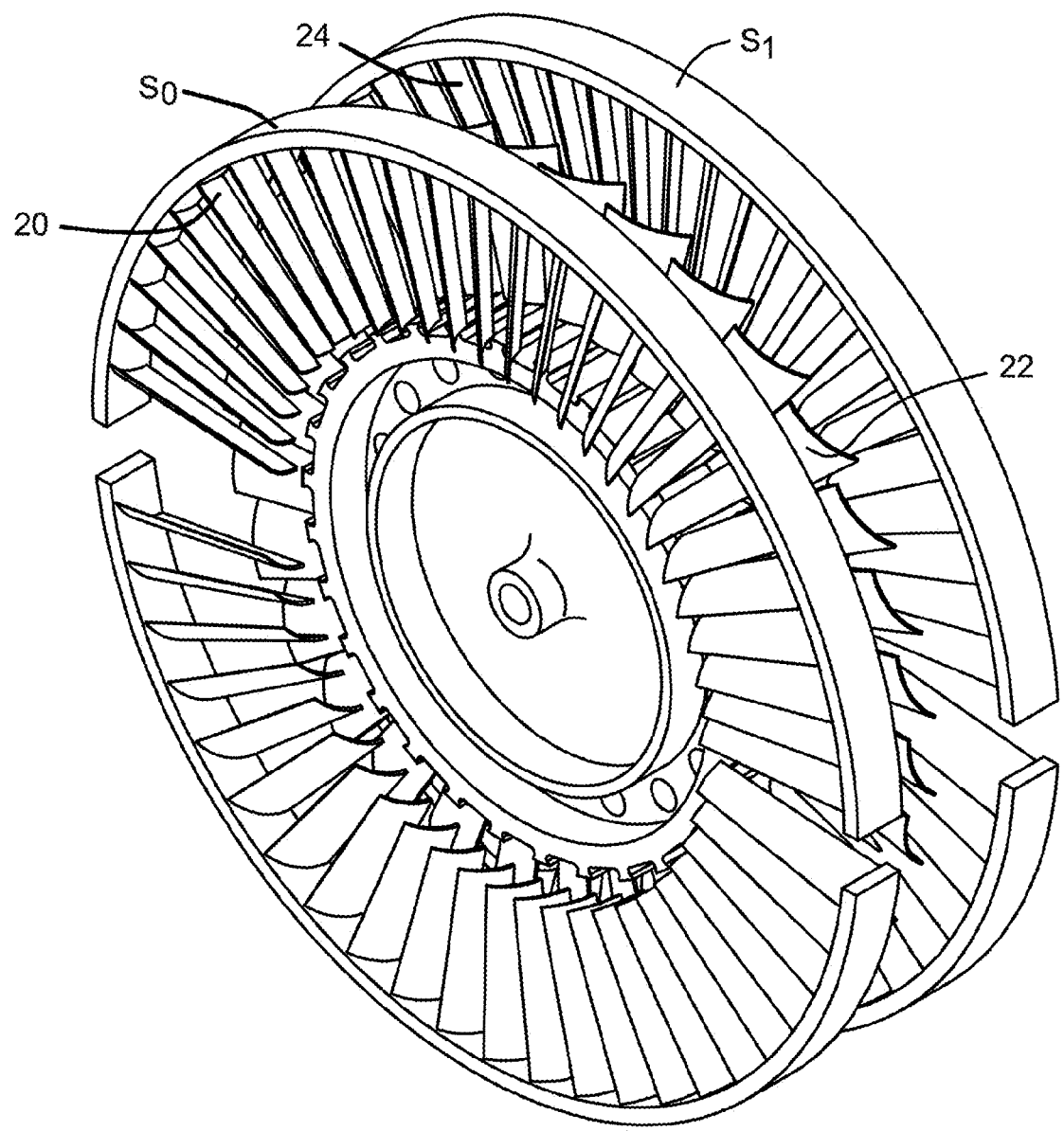
FIG. 2 is a perspective view of stage S0 and stage S1 with rotating blades or buckets therebetween, illustrating the different blade counts in the upper and lower compressor halves of these stages.
Figure 3:
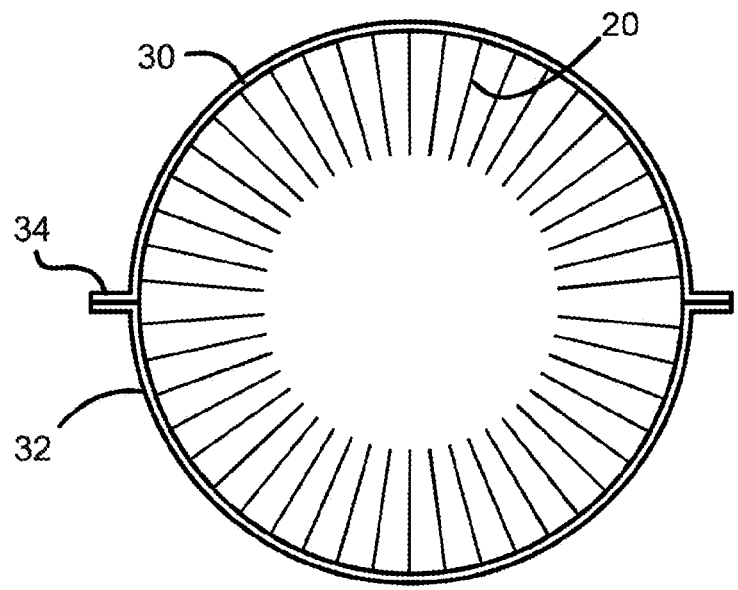
FIG. 3 is a schematic end view illustrating a compressor having an equal stator vane count in both upper and lower halves of the compressor stage.
Figure 4:
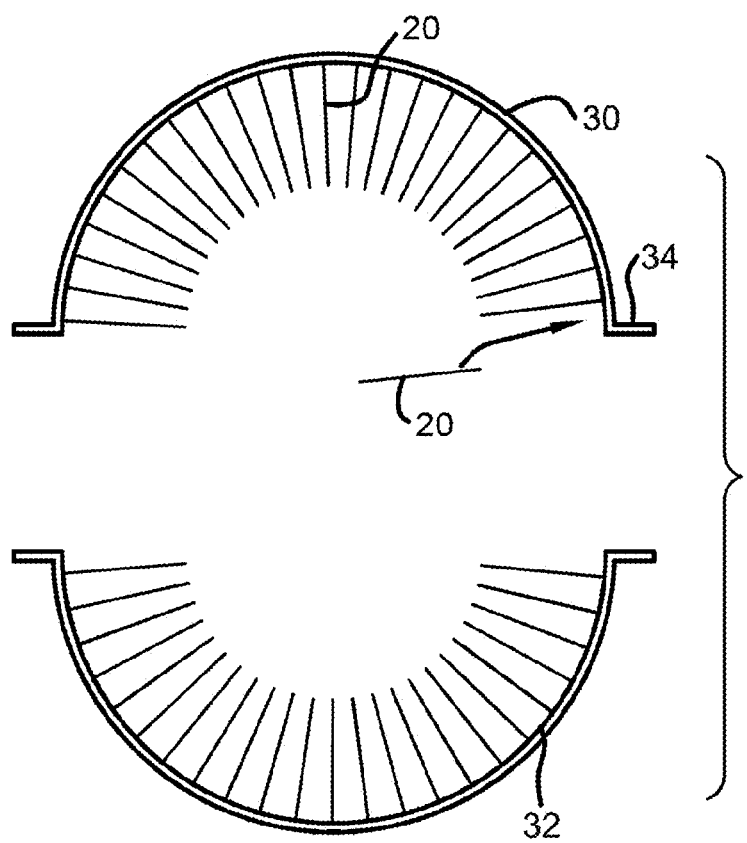
FIG. 4 is a schematic illustration of the removal of the upper compressor half.

Referring to. FIG. 2, there is schematically illustrated the stator vanes 20 of stage S0 and the stator vanes 24 of stage S1. The buckets 22 mounted on the rotor 12 are illustrated disposed between the stator vanes 20 and 24. The stator vanes 20 and 24 as well as stator vanes of other stages are typically attached to the upper and lower casing halves, schematically illustrated at 30 and 32 respectively in FIGS. 3 and 4. The upper and lower halves of the compressor casing may be secured at the horizontal midline to one another by bolted flanges 34 which enable the upper half 30 of the casing to be removed from the lower half 32 with the rotor (not shown) retained in the lower half. The upper and lower halves of the stator vanes 20 and 24 illustrated in FIG. 2 are shown separated from one another for clarity.

Compressors and their associated components may need to be repaired or upgraded during their service life. In some applications it may be desired to replace stator vanes with vanes having a new shape or profile and/or grouping configuration. Some known processes currently require the removal of the rotor, which significantly increases outage duration and cost. An apparatus, according to aspects of the present invention, utilizes an iterative process for removing single stator blades with the rotor in place. This in-situ process greatly facilitates upgrading or repairing the compressor as the previous known method required removing the rotor.

Figure 5:
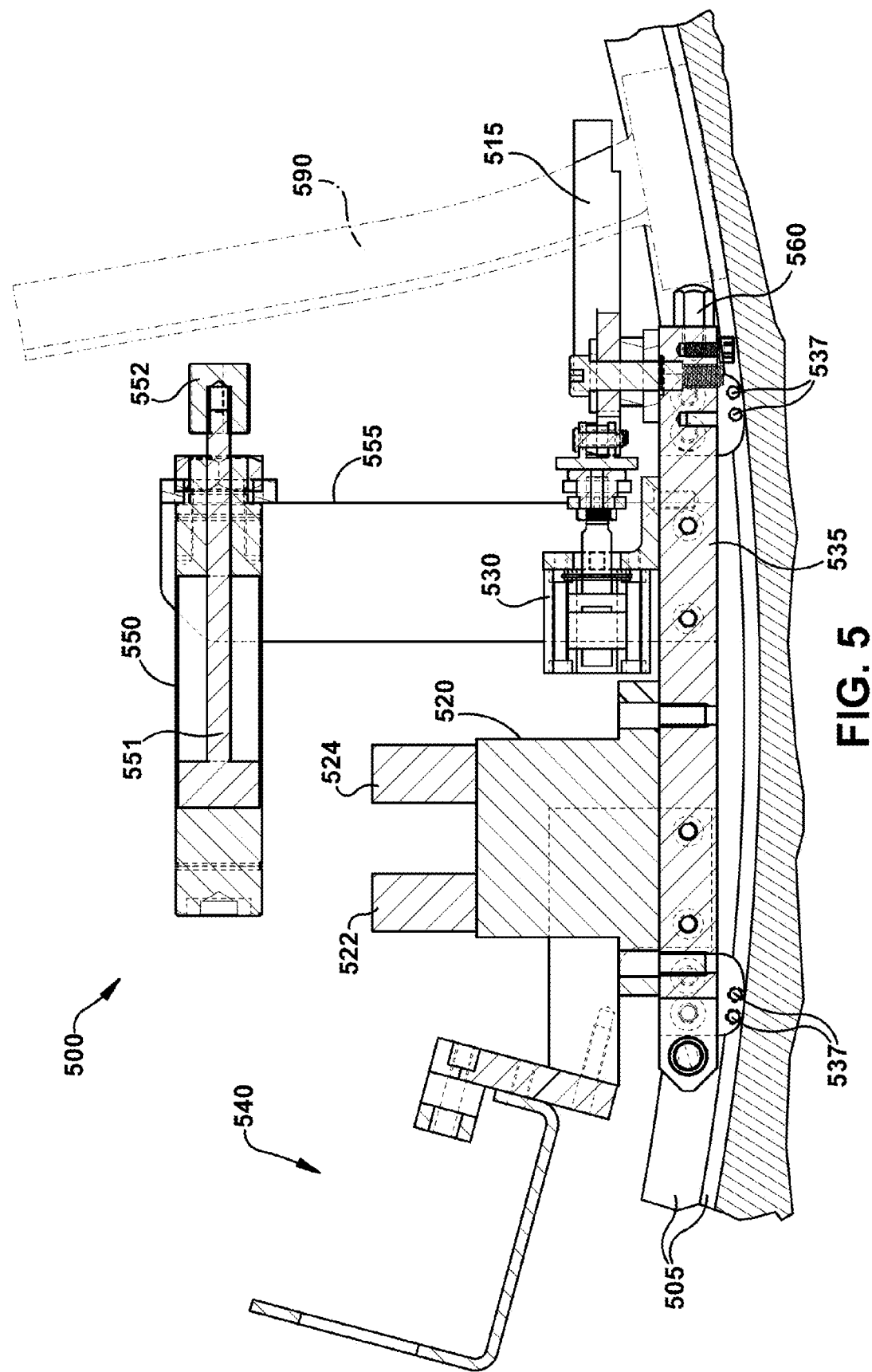
FIG. 5 is a perspective illustration of a tool that can be used to remove a stator vane, according to one aspect of the present invention.

FIG. 5 illustrates a cross-sectional view of an apparatus, according to aspects of the present invention, that can be used to remove a compressor stator vane. The tool 500 may be designed to utilize the hook fit area where the blades reside to locate the tool during use. The hook fit 505 or "T" slot is an area of the compressor case that is designed to guide and hold the stator vanes 590 or stationary components in their relative position in the compressor. The hook fits 505 can be an array or series of circumferential grooves disposed on the inward surface of the compressor case, and span the various stages of the compressor. This hook fit can vary in size in different portions of the compressor, and may be designed to accommodate segmented as well as single blades. The hook fit positions the stationary components both axially and radially for correct positioning relative to the rotating blades found on the rotor.

The tool 500 is a combination of several components assembled to vibrate and extract the single blades. The tool is made up of a vibrator 520, pneumatic cylinder 530, jaws 515 (e.g., left hand and right hand) all mounted on a skid 535. The skid 535 includes pins 537 that fit into and slide along a portion of the blade hook fit 505. Air supply lines (not shown), which may use/transport compressed air, can be used to power the tool 500. A bracket 540 can be used to retain the cables and hoses used to control and/or power the tool 500. The vibrator 520, may include power supply connections 522, 524 for connection of any appropriate power source. For example, compressed air supply lines (not shown), can be connected to connections 522, 524. Alternatively, any other suitable power source could also be used (e.g., electrical power supply lines, battery power, etc.) to power the vibrator 520 or other elements of tool 500.

A blade tip pushing device 550 is attached to the skid 535 via a bracket 555. The tip pushing device 550 may be powered by compressed air, electric motor or any other suitable means. The device 550 includes a moveable plunger 551 having a blade contact element 552. The tip pushing device can be used to rock the blade 590 (shown in phantom) back and forth, or push it to stay in contact with the blade 590. An additional base contact point 560 (e.g., a bolt head) may also be used to contact the base portion of blade 590. As can be seen, the present invention provides a device having multiple blade contact points (e.g., the jaws 515, blade contact element 552, base contact point 560) and enables a blade or vane 590 to be removed in an improved manner compared to known removal techniques. In other embodiments of the present invention, multiple blades or groups of blades may be removed with tool 500.

Figure 6:
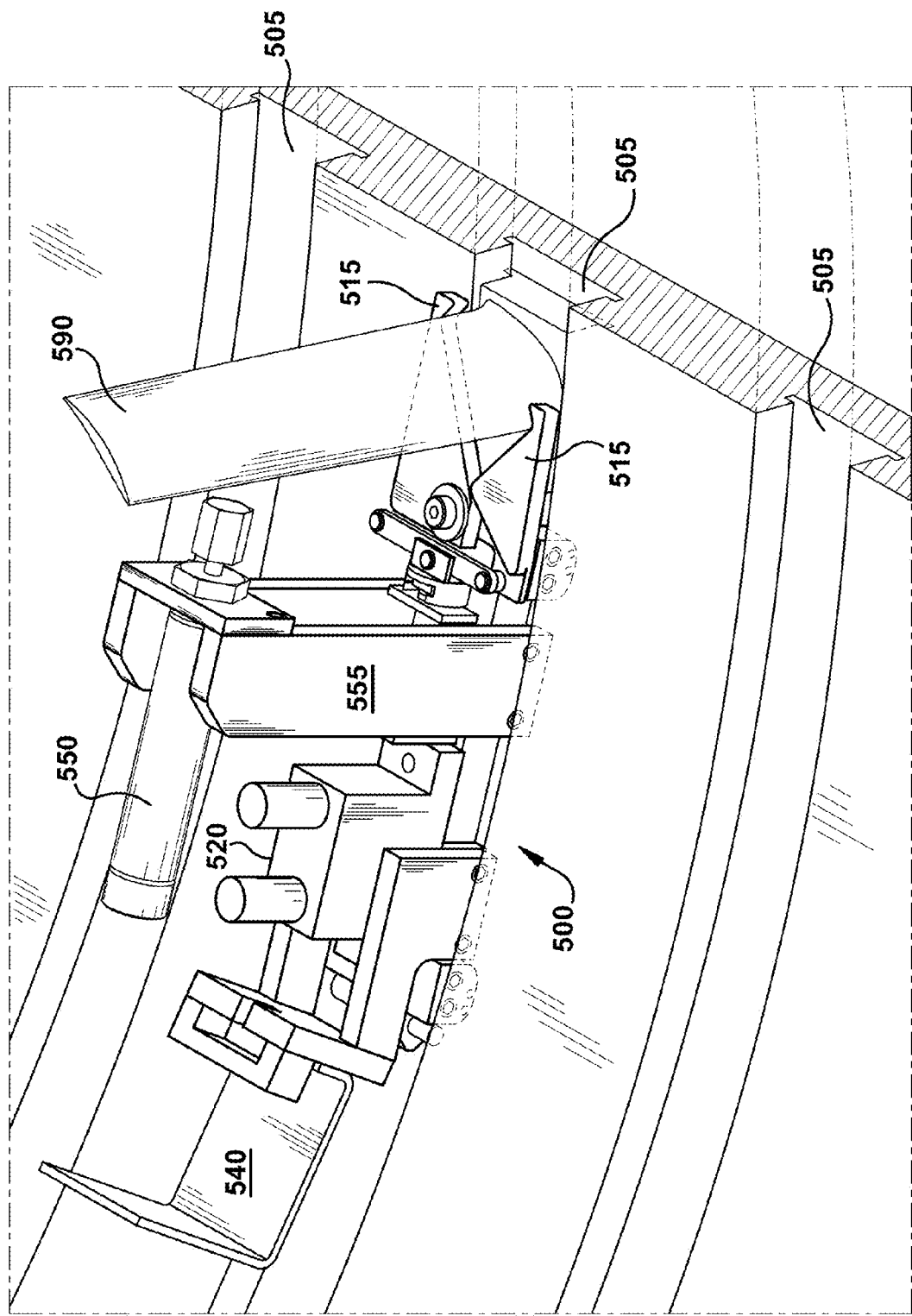
FIG. 6 is a perspective illustration of a tool grasping a blade, and a portion of the hook fit slot in a compressor case, according to an aspect of the present invention.

FIG. 6 illustrates a perspective view of the tool 500 grasping a blade 590, and a portion of the hook fit slot 505 in a compressor case. The tool 500 may also be equipped with a control device (not shown), to control and actuate the clamping action of the jaws 515, to control the vibrator 520 and/or tip pushing device 550. The control device may include computerized control or manual control devices.

Figure 7:
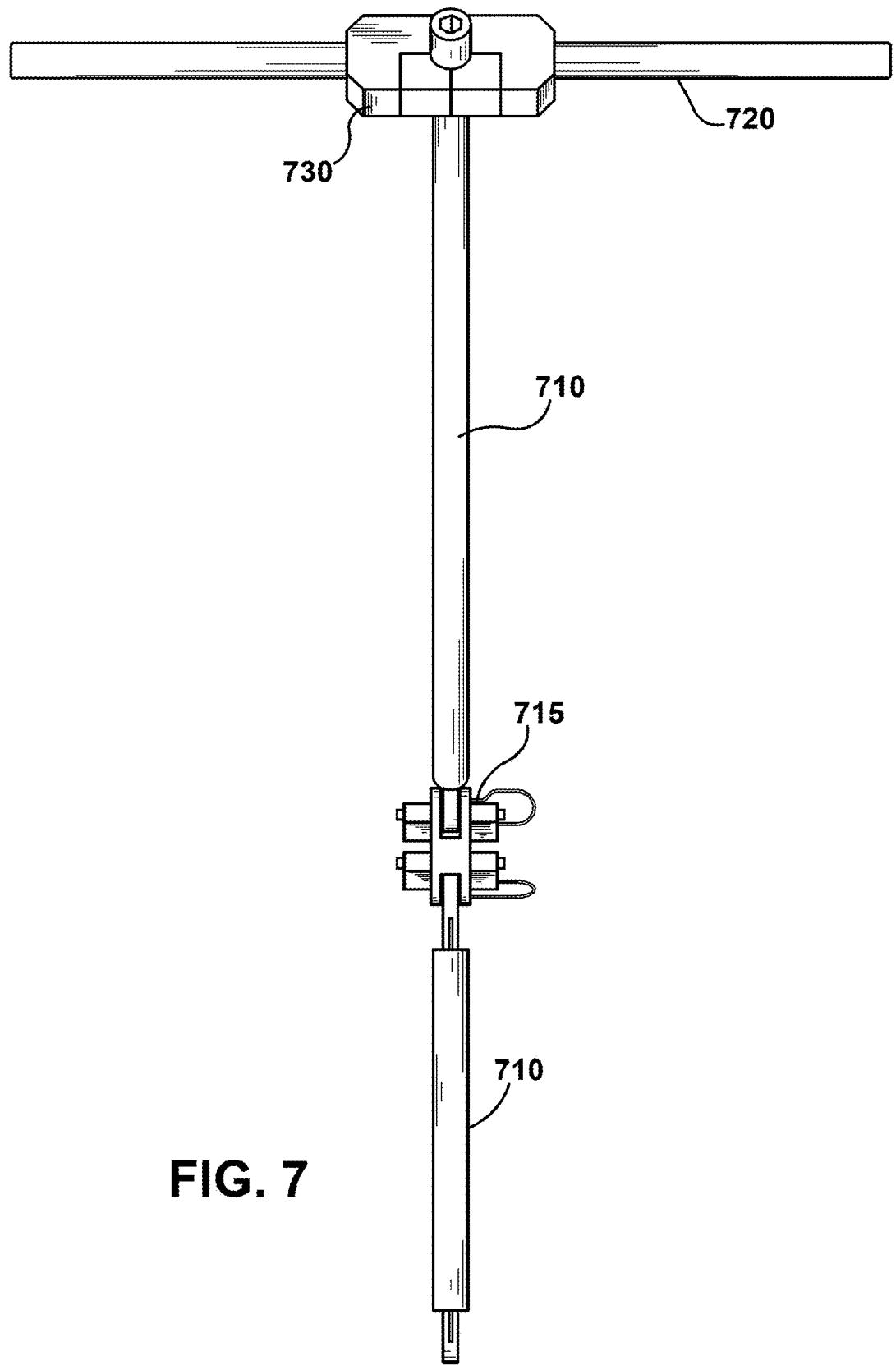
FIG. 7 is a perspective illustration of extension handles that may be used in conjunction with the tool of FIG. 5, according to an aspect of the present invention.

FIG. 7 illustrates the short and long metal extensions 710 that may be linked together with pins 715 or other suitable fasteners/couplings to allow for the needed length to reach the various blades in the compressor. A handle 720 may be provided that can be adjusted by loosening or tightening the handle clamp 730 to fit the position an operator, machine or machine attachment. The metal extensions 710 and handle 720 may be straight, curved or combinations thereof as desired for the specific application. An additional feature of the tool 500 is that it may be equipped with a mechanical jack (not shown), or other pulling device to provide additional pulling force as necessary for severely stuck or hard to move vanes or blades.

Figure 8:
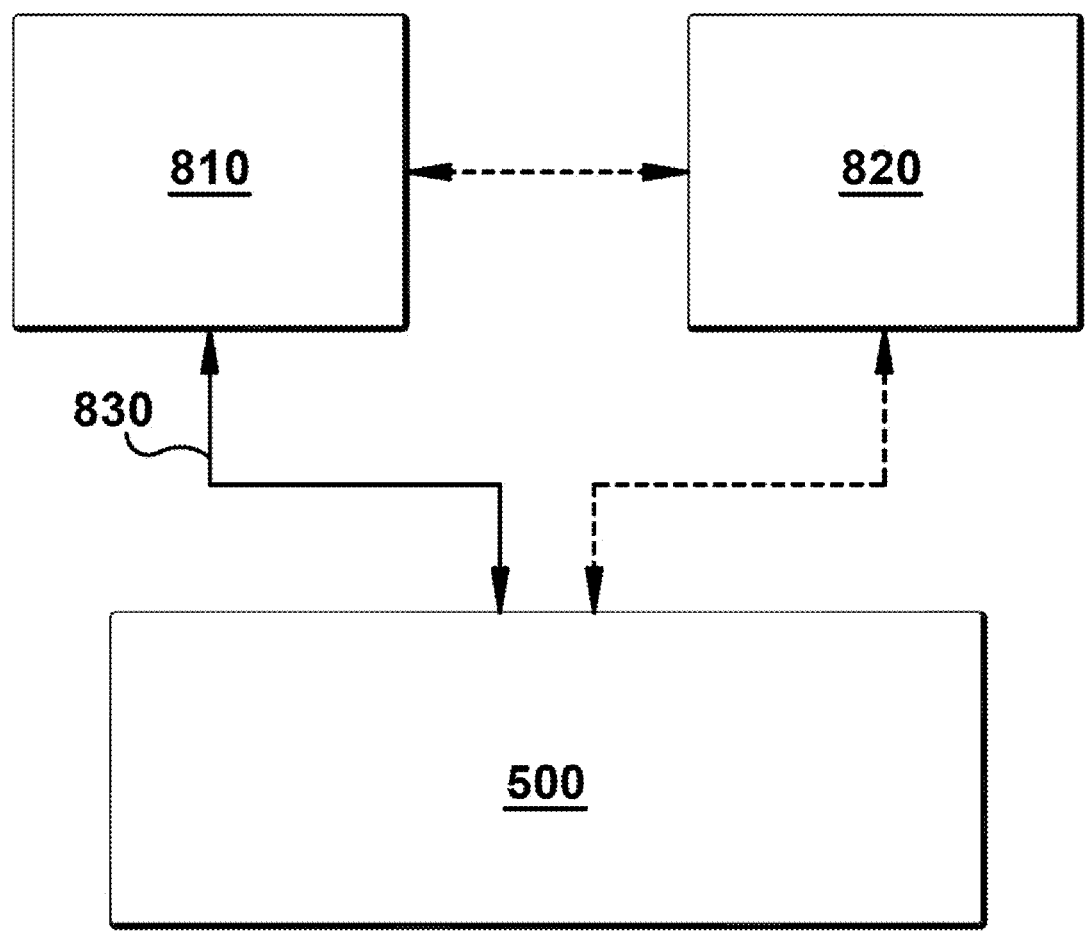
FIG. 8 is a block diagram of a power and control system that may be used in conjunction with the tool of FIG. 5, according to an aspect of the present invention.

FIG. 8 illustrates a power and control system that may be used with tool 500. A power source or supply 810 is connected to tool 500 via connection lines 830. The power supply may include electrical power (e.g., AC and/or DC power), pneumatic power (e.g., compressed air), hydraulic power or any other suitable power source. The connection lines 830 may be any suitable device for the transmission of the power (e.g., conductive cables/wires, compressed air hoses/lines, etc.). A control system may be used to control and/or actuate the power supply 810 and/or tool 500, and may comprise computer control devices or manual control devices). In one example, the control device could be a laptop computer having a graphic interface allowing an operator to control the removal process. In another example, the control device may be a simple set of manually operated switches or levers that activate or deactivate various features of the power supply 810 and/or tool 500. The control system 820 may be connected to the power source 810 and/or the tool 500 via any suitable communication medium (e.g., wired or wireless communication lines, cables, etc.)

The apparatus or tool 500 is moved into place by sliding down the hook fit until it engages a stator blade. The tool's jaws 515 are actuated and the blade is captured in the jaws 515. The vibrator 520 is turned on to provide a vibrating action to the blade being extracted. Alternatively, a peening apparatus or peening gun can be used in place of vibrator 520. At this point the operator pulls on the handle 720, attached to the tool 500 via extensions 710, and pulls the stator blade toward the horizontal joint of the compressor case where it is removed from the compressor. This process is repeated until all, or the desired number of, blades have been removed from the compressor. The tool may be used with any dynamoelectric machine, including, but not limited to compressors, gas turbines or steam turbines.

It will be appreciated that the removal of the upper casing half of the compressor to add, repair or upgrade additional stator vanes does not require the removal of the rotor from the lower casing half. This enables the compressor to be modified in the field or in situ.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tool for use in removing at least one airfoil, comprising:
   a skid for mounting tool components, the skid including pins configured to slide along a portion of a hook fit groove;
   a vibrator mounted on said skid;
   jaws configured to clamp onto a lower portion of the at least one airfoil, the jaws mounted on the skid;
   a blade tip pushing device attached to the skid, the blade tip pushing device configured for pushing on an upper section of the at least one airfoil;
   power supply means for powering said tool; and
   wherein the jaws and the blade tip pushing device are configured to provide multiple airfoil contact points.

2. The tool of claim 1, further comprising:
   a base contact point located on a lower portion of the skid, the base contact point configured to provide an airfoil contact point.

3. The tool of claim 2, wherein the at least one airfoil is chosen from at least one of the group consisting of:
   a stator vane, a bucket, a blade, and an inlet guide vane.

4. The tool of claim 1, said vibrator comprising a peening apparatus.

5. The tool of claim 4, wherein said peening apparatus is vibrationally connected to said jaws, so that activation of said peening apparatus assists in removal of said at least one airfoil.

6. The tool of claim 1, wherein said vibrator is vibrationally connected to said jaws, so that activation of said vibrator assists in removal of said at least one airfoil.

7. The tool of claim 1, wherein the jaw activator is powered by at least one of:
   a hydraulic system and a pneumatic system.

8. The tool of claim 1, said power supply means comprising at least one of compressed air, a pneumatic system and a hydraulic system.

9. The tool of claim 1, further comprising:
   a control system for controlling operation of one or more of said vibrator and said jaws.

10. The tool of claim 1, further comprising:
    a handle attached to said skid;
    wherein said handle can be grasped by an operator or connected to a pulling apparatus to assist in removing said at least one airfoil.

11. A tool for use in removing at least one airfoil, comprising:
    a skid for mounting tool components, the skid configured to engage and slide along at least one groove in a case of a dynamoelectric machine;
    a vibrator mounted on said skid;
    at least one jaw connected to a jaw activator, said at least one jaw configured to engage a lower portion of said at least one airfoil;
    a blade tip pushing device attached to the skid, the blade tip pushing device configured for pushing on an upper portion of the at least one airfoil;
    power supply means for powering said tool;
    wherein the at least one airfoil is chosen from at least one of the group consisting of a stator vane, a bucket, a blade, and an inlet guide vane.

12. The tool of claim 11, wherein the dynamoelectric machine is chosen from at least one of the group consisting of:
    a compressor, a gas turbine and a steam turbine.

13. The tool of claim 12, the at least one groove comprising a hook fit.

14. The tool of claim 11, wherein the vibrator is chosen from at least one of the group consisting of:
    a peening apparatus and a peening gun; and
    wherein the vibrator is vibrationally connected to the at least one jaw, so that activation of the vibrator assists in removal of the at least one airfoil.

15. The tool of claim 11, wherein the jaw activator is powered by at least one of:
    a hydraulic system and a pneumatic system.

16. The tool of claim 11, wherein the power supply means is powered by at least one of:
    an electrical system, a hydraulic system and a pneumatic system.

17. A tool for use in removing an airfoil, comprising:
    a skid for mounting tool components;
    jaws configured to clamp onto a lower portion of the airfoil, the jaws mounted on the skid;
    a blade tip pushing device attached to the skid, the blade tip pushing device configured for pushing on an upper portion of the airfoil; and
    wherein the jaws and the blade tip pushing device are configured to provide multiple airfoil contact points.

18. The tool of claim 17, further comprising:
    a base contact point located on a lower portion of the skid, the base contact point configured to provide an airfoil contact point on a bottom portion of the airfoil, wherein the bottom portion of the airfoil is below the lower portion of the airfoil.

19. The tool of claim 18, further comprising:
    a vibrator mounted on the skid, the vibrator being vibrationally connected to the skid and the jaws, so that activation of the vibrator facilitates removal of the airfoil.

* * * * *